United States Patent
Campbell

(12) 
(10) Patent No.: US 6,571,229 B1
(45) Date of Patent: May 27, 2003

(54) METHOD AND APPARATUS FOR INERATIVE TRAINING OF A CLASSIFICATION SYSTEM

(75) Inventor: William Michael Campbell, Phoenix, AZ (US)

(73) Assignee: Motorola, Inc., Schaumburg, IL (US)

( * ) Notice: Subject to any disclaimer, the term of this patent is extended or adjusted under 35 U.S.C. 154(b) by 303 days.

(21) Appl. No.: 09/584,155

(22) Filed: May 31, 2000

(51) Int. Cl.$^7$ .............................. G06F 15/18; G06E 3/00
(52) U.S. Cl. ............................................. 706/20; 706/15
(58) Field of Search ..................................... 706/20, 15

(56) References Cited

U.S. PATENT DOCUMENTS 5,917,953 A * 6/1999 Ausbeck, Jr. ................ 382/239

FOREIGN PATENT DOCUMENTS

EP 0997828 A 5/2000

OTHER PUBLICATIONS

Assaleh K T et al: "Speaker identification using a polynomial–based classifier" ISSPA '99. Proceedings of the Fifth International Symposium on Signal Processing and Its Applications (IEEE Cat. No. 99EX359), Proceedings of Fifth International Symposium on Signal Processing Symposium on Signal Processing and its Applications, Brisbane Qld., Australia, Aug., 22–25, pp. 115–118 vol. 1, XP002183435.

Fernandes P et al: "A New Storage Scheme for an Efficient Implementation of the Sparse Matrix–Vector Product" Parallel Computing, Elsevier Publishers, Amsterdam, NL, vol. 12, No. 3, Dec. 1, 1989, pp. 327–333, XP000081653.

Campbell W M et al: "Polynomial Classifier Techniques for Speaker Verification" 1999 IEEE International Conference on Acoustics, Speech, and Signal Processing, Phoenix. AZ, Mar. 15–19, 1999, IEEE International Conference on Acoustics, Speech, and Signal Processing (ICASSP), New York, NY: IEEE, US vol. 1, Mar. 15, 1999, pp. 321–321, XP000900123.

* cited by examiner

*Primary Examiner*—George B. Davis
(74) *Attorney, Agent, or Firm*—William E. Koch

(57) ABSTRACT

A process and apparatus for solving the product y=Rw, where R is a matrix and w is a vector. The process includes a steps of using a matrix outer product structure of R to determine all of the unique entries in R and storing the unique monomials. A different unique number is assigned to unique entries so that each unique entry has an associated number, and the associated numbers are stored. Rw is then solved using the stored associated numbers to obtain a result in terms of the associated numbers, and converting the result to entries from the matrix R. In the preferred embodiment, the process is used for iterative training in a classification system and especially a classification system on a portable platform.

28 Claims, 1 Drawing Sheet

METHOD AND APPARATUS FOR INERATIVE TRAINING OF A CLASSIFICATION SYSTEM

FIELD OF THE INVENTION

This invention relates to classification systems, e.g. speaker recognition systems, and more specifically to a method and apparatus for iterative training of a classification system.

BACKGROUND OF THE INVENTION

Modern classification systems require high accuracy training for optimal performance in a variety of environments. One method of achieving high accuracy is through discriminative training methods. A discriminative polynomial classifier for speaker verification is described in detail in W. M. Campbell and K. T. Assaleh, "Polynomial Classifier Techniques for Speaker Verification", in *Proceedings of the International Conference on Acoustics, Speech, and Signal Processing*, pp. 321–324, 1999. Iterative techniques to solve linear equations have typically been used in two areas. In the numerical analysis community, methods are targeted toward solving large sparse systems. In the engineering community, approaches have concentrated on using iterative methods for recursive learning. The present disclosure applies to both areas.

Polynomial discriminative training methods optimize the performance of a classifier by maximally separating the decision regions. The main advantages of this polynomial approach are:

the training method is able to handle large amounts of enrollment data in a straightforward manner;

the architecture is based upon a simple multiply-add only architecture;

the classifier is trained discriminatively with an algorithm achieving the global minimum; and the classifier output approximates a posteriori probabilities, which eliminates the need to perform cohort selection and cohort scoring (cohorts are incorporated as part of the training).

A major difficulty in using polynomial discriminative training for previous systems is the large memory footprint required for training. The training process requires the solution of a large (for small platforms) matrix problem. This is a serious drawback for portable devices, sometimes prohibiting discriminative training from being a viable choice. Many portable devices (e.g., cell phones) have high MIPS (i.e., they include DSPs and the like) but little memory. Therefore, it is desirable to construct methods and apparatus that minimize memory usage and produce equivalent functionality.

Accordingly the present disclosure describes a new and improved method and apparatus for iterative training of a classification system in which memory usage is substantially reduced while producing equivalent functionality.

BRIEF DESCRIPTION OF THE DRAWINGS

Referring to the drawings.

DESCRIPTION OF THE PREFERRED EMBODIMENT

Figure 1:
FIG. 1 is a simplified block diagram of a basic training implementation.

Turning now to FIG. 1, a basic training implementation 10 is illustrated for use in a standard method of applying the polynomial classifier discriminatively for speaker recognition. Implementation 10 includes an audio input 11, an analog-to-digital converter 12, a digital signal processor (DSP) 14, a data link 16 and a computer 18. It should be noted that several of the elements are shown separately for convenience of this description, but could be combined; e.g., data link 16 could be removed and DSP 14 and computer 16 could be the same element. Speech is collected at audio input 11 and then converted to digital samples by A/D converter 12. DSP 14 extracts feature vectors for the input speech, say $x_1$, $x_2$, etc.

After this process, two more steps are required: calculation of an r vector, and training of a model w. The calculation can be performed in several ways: calculate r in DSP 14 and send r across data link 16; and send the feature vectors to computer 18 and calculate r and then w in computer 18. The best method depends upon the implementation and memory requirements. Details of the calculation of the r and w vectors are given below in algorithm I.

Denote the vector of polynomial basis terms up to order k for a given vector x by $p(x)$; i.e., $p(x) = \{1\ x_1\ x_2\ \ldots\ x_n\ x_1 x_2\ \ldots\ \}^t$. Denote by $p_2(x)$ the vector of polynomial basis terms up to order 2K. Algorithm I, set forth below, shows the standard method of training.

Algorithm I: Training Algorithm

1. For i=1 to # speakers.
2. Set $r_i=0$. $a_i=0$.
3. for k=1 to # vectors from speaker i.
4. Read in feature vector k in speaker i, $x_{i,k}$.
5. $r_i = r_i + p_2(x_{i,k})$.
6. $a_i = a_i + p(x_{i,k})$.
7. Next k.
8. Next i.
9. Find $$r = \sum_{i=1}^{\# \text{speakers}} r_i$$

10. For i=1 to # speakers.
11. $r = r + ((N/N_i) - 2) r_i$.
12. Map r→R using a mapping.
13. Solve $R w_i = ((N/N_i) - 1) a_i$.
14. Next i.

$$N = \sum_{i=1}^{\# \text{speakers}} N_i$$

where and $N_i$=feature vectors for the $i^{th}$ speaker.

The main difficulty in implementing algorithm I on a portable platform is contained in steps 12 to 14. Up until that point, algorithm I deals with a non-redundant version of the R matrix, the vector r. The process of mapping r to R consumes considerable memory and requires the storage of an auxiliary index map, m, which tells where an element of r belongs in R; i.e., $\{R\}_{j,k} = \{r\}_{m(j,k)}$, where $\{\ \}_{j,k}$ means the (i,j)th term of the matrix R.

As an example, a typical system may use an input feature vector of dimension 12 and a polynomial order of K=3. Then the vector r has a length of 18,564 and the matrix R has 207,025 elements. Therefore, R requires an order of magnitude more storage than r.

Figure 2:
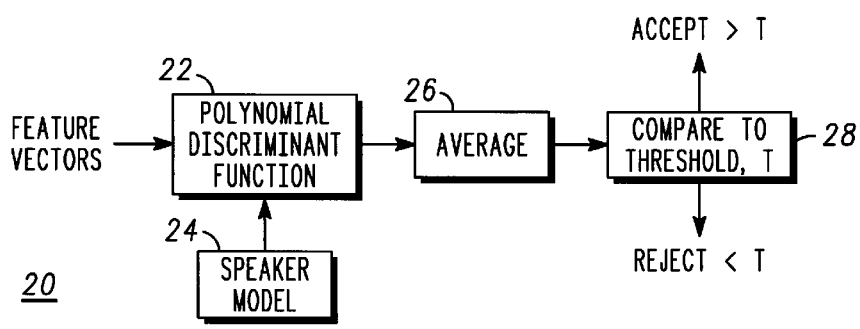
FIG. 2 is a simplified block diagram of polynomial classifier structure.
Figure 3:
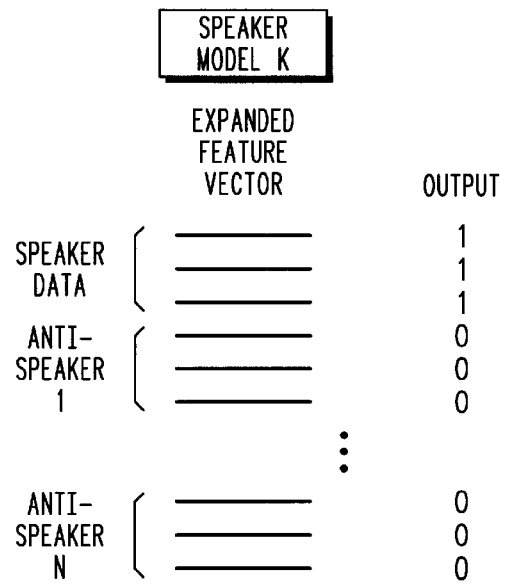
FIG. 3 illustrates a training procedure for the polynomial classifier structure of FIG. 2.

Turning now to FIG. 2, a simplified block diagram of polynomial classifier structure 20 is illustrated. Structure 20 includes a polynomial function block 22 having an input for feature vectors produce from an utterance to be classified, and an input for speaker models from a model memory 24. The output of polynomial discriminant function block 22 is given by $f(x)=w^t p(x)$. Here, x is a feature vector, w is a vector of coefficients (the speaker model), and p(x) is a vector of monomial basis terms of degree K or less. When enrolling speaker i, the output of the classifier is trained to approximate 1 on the speaker's feature vectors and 0 on the anti-speaker data, as illustrated in FIG. 3. A mean-squared error criterion is used for this training process The resulting classifier approximates a posteriori probabilities.

Verification is accomplished by averaging in a block 26 the output of polynomial discriminant function block 22, f(x), over the feature vectors derived from the input utterance. The resulting average score is compared in a block 28 to a threshold, T, and an accept/reject decision is made.

Iterative methods of training are a common technique used to solve linear equations; e.g., Rw=b. The basic structure of an iterative method is as follows. First, an initial guess is made, $w_0$. Then, a descent direction, d, is estimated using data from previous iterations, the (typically) unaltered matrix, R, and the current best solution, $w_i$. In many cases, this involves computing a product Rp, where p is some auxiliary vector. The new solution estimate is then given by $w_{i+1} = w_i + \alpha d$, where $\alpha$ is some suitable chosen scalar.

A common method for iterative training is implemented in Kaczmarz algorithm for recursive learning. For more details see J. Schurmann, Pattern Classification, John Wiley and sons, Inc. 1996; and S. Kaczmarz, "Angenaherte Auflosung von Systemen Linearer Gleichungen" *Bull. Internat. Aca. Polon. Sciences et Lettres,* pp. 355–357, 1937. The method uses the update $$w_{i+1} = w_i + \mu(b_j - a_j x_i) a_j^t,$$

where $a_j$ is the jth row of R, $b_j$ is the jth entry of b, and $0 < \mu |a_j|_2^2 < 2$. The two main advantages of this method are (1) it is computationally simple, and (2) the update involves only one row of R.

More sophisticated algorithms for iterative training are the successive over-relaxation (SOR) algorithm and the conjugate gradient (CG) algorithm. The SOR algorithm is an extension of the well-known Gauss-Seidel method with a parameter $0<\omega<2$, which can be varied to give difference convergence rates. The CG algorithm has the advantage that there are no direct parameters to estimate, and its convergence rate is determined by the condition of the matrix R. While these iterative methods are described herein as a preferred embodiment, because of their common use and applicability to the present problem, many other methods are available and may be used herein.

The iterative methods are used to solve step 14 in algorithm I. Several properties of R are critical. First, R is symmetric, non-negative definite, and square by structure. Second, in some specific applications, it may be assumed (with no violations in practice) that R is nonsingular. These properties allow all of the mentioned iterative methods to be applied. Here it should be noted that the present novel method of reducing the required memory can be used in conjunction with the mapping of any matrix, R, with these properties, and the present invention is not limited to training voice classification or verification systems.

Generally, the present invention is a novel method and apparatus for computing Rw for an arbitrary w without explicitly performing the mapping from r to R. The basic idea is to utilize the structure of the matrix R. As stated above, training of the classifier is performed to approximate an ideal output 0 for all anti-speakers and 1 for the input model (as illustrated in FIG. 3). In the present training method, this optimization is solved with normal equations and "feature space" correlation matrices, $R = M^t M$ or $$R = \sum_{i=1}^{n} p(x_i)(p(x_i))^t.$$

Thus, the process solves the equation $Rw = M^t 0$, where R and $M^t 0$ are known and w is the unknown. In a typical example, 12 features and a 3rd degree system may be used. In this example, the vector r has 18,564 elements (where r represents the unique entries of R) and the matrix R has 207,025 entries. Therefore, in the present novel process constructing the matrix R is avoided, so that the required memory is reduced by a factor of >10.

The present process solves $Rw = M^t 0$ using iterative methods e.g., Steepest Descent, Conjugate Gradient, or Kaczmarz algorithm. To perform the iterative method, the product y=Rw must be computed at each iteration. Typically, y and w may each contain 455 elements while the matrix R contains 455×455 elements. However, to compute the product at a specific iteration:

$$(y)_i = \sum_{j=1}^{n} \{R\}_{i,j} \{w_i\}_j$$

only the $i^{th}$ row of R is needed.

In the present method, to compute y=Rw, the following algorithm is used.

First, use a matrix outer product structure of R:

$$R = \sum_{i=1}^{n} p(x_i)(p(x_i))^t$$

Let n=1, then; $\{R\}_{i,j} = \{p(x)\}_i \{p(x)\}_j$

Let p=p(q), where q is a vector of primes;

Let $r_{int} = p_2(q)$;

Then to find the (i,j)th entry of R, find $m = \{p\}_i \{p\}_j$ in the integer version of r, $r_{int}$.

Call this location $i_m$.

Then $\{r\}_{i_m}$ is the required entry of R.

In a simplified example, let y=Rw include 2 features with a 1st degree classifier. Then:

$$p(x) = \begin{vmatrix} 1 \\ x_1 \\ x_2 \end{vmatrix}$$

$$R = p(x)p(x)^t = \begin{vmatrix} 1 \\ x_1 \\ x_2 \end{vmatrix} * \begin{vmatrix} 1 & x_1 & x_2 \end{vmatrix} = \begin{vmatrix} 1 & x_1 & x_2 \\ x_1 & x_1^2 & x_1 x_2 \\ x_2 & x_1 x_2 & x_2^2 \end{vmatrix}$$

$$r = \begin{vmatrix} 1 \\ x_1 \\ x_2 \\ x_1 x_2 \\ x_1^2 \\ x_2^2 \end{vmatrix}$$

where r includes only the unique entries of R. In this very simplified form it can be seen that R has nine entries while r has only six.

Converting p to p(q), where q is a vector of primes:

$$p = p(q) = \begin{vmatrix} 1 \\ 2 \\ 3 \end{vmatrix}$$

therefore, $$r_{int} = \begin{vmatrix} 1 \\ 2 \\ 3 \\ 6 \\ 4 \\ 9 \end{vmatrix}$$

Thus, six numbers are stored, rather than nine polynomials. Each entry in the matrix R can be quickly found because each entry is represented by a unique number. This can be seen by noting that the product of two basis elements is a basis element, e.g., $(x_1^2 x_2)(x_3 x_4) = x_1^2 x_2 x_3 x_4$. Let $q_i$ be the ith prime number. Then substitute $q_i$ for $x_i$. To illustrate the effectiveness of this process and using r and $r_{int}$ from the above example:

goal find the (2,3) entry of the matrix R, i.e., $x_1 x_2$.
$m = \{p\}_i \{p\}_j = 2*3 = 6$.
$m = 6$ is the 4th entry of $r_{int}$; $\{r\}_4 = x_1 x_2$.

To further illustrate the steps of the present procedure, assume a feature vector with n variables, $x_1, \ldots, x_n$. Now let $q_1, \ldots, q_n$ be the first n prime numbers. Then $$x_{i1} x_{i2} \ldots x_{ik} \rightarrow q_{i1} q_{i2} \ldots q_{ik}$$

This mapping turns the process of locating a monomial term into a much simpler numerical search. Based upon this mapping, an algorithm for computing an arbitrary product, Rw, is derived below.

---
Calculation of Y = Rw
---
1) Let q be the vector of the first n primes.
2) Let $v = p(q)$ and $v_2 = p_2(q)$.
3) Sort $v_2$ into a numerically increasing vector, $v_2'$.
   Store the permutation, π, which maps $v_2'$ to $v_2$.
4) For i = 1 to (Number of rows of R)
   5) Let $\{y\}_i = 0$.

---
-continued

Calculation of Y = Rw
---
   6) For j = 1 to (Number of rows of R)
      7) Compute $n = \{v\}_i \{v\}_j$
      8) Perform a binary search for n in $v_2'$, call
         the index of the resulting location $i_n'$
      9) Using the permutation π, find the index,
         $i_n$, in $v_2$ corresponding to the index, $i_n'$
         in $v_2'$
      10) $\{y\}_i = \{y\}_i + \{r\}_{in} \{w\}_j$
   11) Next j
12) Next i.

In an actual test, the new iterative procedure was applied to the YOHO database for speaker verification. For information on the YOHO database see J. P. Campbell, Jr., "Testing with the YOHO CD-ROM voice verification corpus", in *Proceedings of the Internation Conference on Acoustics, Speech, and Signal Processing*, pp. 341–344, 1995.

Feature extraction was performed by examining 30 ms frames every 10 ms. For each frame, mean removal, pre emphasis, and Hamming window were applied. Then, 12 LP coefficients were obtained and transformed to 12 LP cepstral coefficients (LPCC's). Cepstral mean subtraction was performed on the result.

A polynomial classifier of degree 3 was applied to the 12 dimensional feature vectors generated. This resulted in a speaker model with 455 coefficients per speaker. The anti-speaker population vector, $r_{imp}$, was constructed by computing an $r_k$ for each speaker and then summing across all speakers.

The memory usage for the new iterative procedure was compared to the usage required in the original direct approach described above to illustrate the advantage of the new iterative procedure. For the original approach, allocate memory space for r (double precision, 8*18,564 bytes), the index map (16 bit int, 2*455*455 bytes), and for the matrix R (double precision, 8*455*455 bytes) for a total of 2,218,762 bytes. For the new iterative procedure, allocate memory space for r (double precision, 8*18,564 bytes), v (16 bit int, 18,564*2 bytes), $v_2'$ (32 bit int, 18,564*4 bytes), π (16 bit int, 18,564*2 bytes), and scratch space for the iterative algorithm (double precision, 455*5*8 bytes) for a total of 315,224 bytes. The memory savings is thus 2,218,762/315,224 or approximately 7.

Thus, new and improved apparatus and method are disclosed for computing complicated mathematical processes, such as the product of a large matrix and a large vector. The new and improved apparatus and method greatly reduce the amount of memory required to perform the mathematical processes so that some very complicated systems, such as classification systems, can be incorporated in portable platforms (e.g., cellular telephones and the like). Further, because of the substantial reduction in the amount of memory required to perform the various processes, iterative training can be used in the classification systems on portable platforms, which greatly enhances their operation.

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. In a process of solving the product y=RW using a speech recognition system, where R is a matrix representing a input signal from a speaker, w is a vector representing a model of the input signal, and y is a matrix representing a duplicate of the input signal, a method of verifying the speaker comprising the steps of:

using a matrix outer product structure of R, determining all of the unique entries in R and storing the unique entries;

assigning a different unique number to unique entries so that each unique entry has an associated number, and storing the associated numbers;

performing steps of computing Rw using the stored associated numbers to obtain a result in terms of the associated numbers, and converting the result to entries from the matrix R; and using the product y=Rw to verify the speaker.

2. The method claimed in claim 1 wherein the step of assigning a different unique number includes assigning prime numbers.

3. The method claimed in claim 1 wherein the process of solving the product y=Rw is used in an iterative system and the product y=Rw is computed at each iteration.

4. The method claimed in claim 3 wherein the step of using a matrix outer product structure of R includes providing R as a matrix of entries which is symmetric, non-negative definite, and square by structure, and providing w as a plurality of polynomials.

5. The method claimed in claim 1 wherein the step of using the matrix outer product structure of R includes using an equation $$R = \sum_{i=1}^{n} p(x_i)(p(x_i))^t.$$

6. The method claimed in claim 5 wherein p(x) is a vector generally in a form $$p(x) = \begin{vmatrix} 1 \\ x_1 \\ x_2 \\ \vdots \\ x_n \\ \vdots \\ x_{i_1} x_{i_2} \ldots x_{i_k} \\ \vdots \end{vmatrix}$$

where $i_1 \leq i_2 \leq \ldots \leq i_k$ and k is the degree.

7. The method claimed in claim 6 wherein R is a matrix generally in a form $$R = p(x)p(x)^t.$$

8. The method claimed in claim 7 wherein the step of determining all of the unique entries in R includes forming a vector, r, of the unique entries in a form $$\sum_{j=1}^{n} x_{j,i_1} \ldots x_{j,i_{2k}}$$

where:

$$x_j = \begin{vmatrix} x_{j,1} \\ x_{j,2} \\ \vdots \\ x_{j,m} \end{vmatrix}.$$

9. The method claimed in claim 8 wherein the step of assigning a different unique number to unique entries includes converting p(x) to p(q), where q is a vector of primes, and p(q) has entries $$(q_{i_1} q_{i_2} \ldots q_{i_k})$$

where: $q_{i_j}$ is an integer and $i_1 \leq i_2 \leq \ldots \leq i_k$.

10. The method claimed in claim 9 wherein the step of assigning a different unique number to unique entries includes assigning prime numbers to $q_{i_j}$, where j is 1 2 ... k.

11. The method claimed in claim 10 wherein the step of assigning prime numbers to $q_{i_j}$ includes assigning $q_{i_1}=2$, $q_{i_2}=3$, $q_{i_3}=5$, and $q_{i_4}=7$.

12. The method claimed in claim 9 wherein the step of assigning the different unique number to unique entries so that each unique entry has the associated number includes converting r to $r_{int}$ having entries $$(q_{i_1} q_{i_2} \ldots q_{i_{2k}})$$

where: $q_{i_j}$ is an integer.

13. The method claimed in claim 12 wherein the step of performing steps of computing Rw includes using $r_{int}$ to perform mathematical calculations and converting results to entries of R by using $r_{int}=p_2(q)$.

14. The method claimed in claim 13 wherein the step of performing step of computing Rw uses a sorted $r_{int}$.

15. In iterative training of a classification system, a method of verifying a speaker comprising the steps of;

providing a product y=Rw to be computed at each iteration, where R is a matrix of entries representing an input signal from the speaker and is symmetric, non-negative definite, and square by structure, wherein w includes a plurality of polynomials representing a model of the input signal, and wherein y is a matrix representing a duplicate of the input signal;

using a matrix outer product structure of R, determining all of the unique entries in R and storing the unique entries;

assigning a different number to the unique entries so that each unique entry has an associated number, and storing the associated numbers:

performing steps of the product y=Rw using the stored associated numbers to obtain a result in terms of the associated numbers, and converting the result to entries from the matrix R; and using the product y=Rw to verify the speaker.

16. The method claimed in claim 15 including in addition a step of providing a portable platform incorporating the classification system.

17. The method claimed in claim 15 wherein the steps of determining all of the unique entries in R, assigning a different prime number to the unique entries, and performing steps of the product y=Rw include using the algorithm

```
1) Let q be the vector of the first n primes.
2) Let v = p(q) and v₂ = p₂(q).
3) Sort v₂ into a numerically increasing vector, v₂'.
      Store the permutation, π, which maps v₂' to v₂.
4) For i = 1 to (Number of rows of R)
         5) Let {y}ᵢ = 0.
         6) For j = 1 to (Number of rows of R)
              7) Compute n = {v}ᵢ {v}ⱼ
              8) Perform a binary search for n in v₂', call
                 the index of the resulting location iₙ'
              9) Using the permutation π, find the index,
                 iₙ, in v₂ corresponding to the index, iₙ'
                 in v₂'
             10) {y}ᵢ = {y}ᵢ + {r}ᵢₙ {w}ⱼ
         11) Next j
12) Next i.
```

18. A classification system designed to incorporate iterative training comprising:
   computation apparatus including an algorithm designed to perform a plurality of iterations and to compute a product y=Rw at each iteration, where R is a matrix of entries and is symmetric, non-negative definite, and square by structure, and w includes a plurality of polynomials;
   a memory having stored therein all of the unique entries in R, the memory being coupled to the computation apparatus;
   the memory further having stored therein an associated unique number for each unique entry; and
   the computation apparatus being coupled to the memory so as to perform steps of the product y=Rw using the stored associated unique numbers to obtain a result in terms of the associated numbers, and converting the result to entries from the matrix R.

19. A classification system designed to incorporate iterative training as claimed in claim 18 wherein the computation apparatus and memory are part of a portable platform.

20. A classification system designed to incorporate iterative training as claimed in claim 19 wherein the portable platform is a cellular telephone.

21. A classification system designed to incorporate iterative training as claimed in claim 18 wherein the computation apparatus includes the algorithm

```
1) Let q be the vector of the first n primes.
2) Let v = p(q) and v₂ = p₂(q).
3) Sort v₂ into a numerically increasing vector, v₂'.
      Store the permutation, π, which maps v₂' to v₂.
4) For i = 1 to (Number of rows of R)
         5) Let {y}ᵢ = 0.
         6) For j = 1 to (Number of rows of R)
              7) Compute n = {v}ᵢ {v}ⱼ
              8) Perform a binary search for n in v₂', call
                 the index of the resulting location iₙ'
              9) Using the permutation π, find the index,
                 iₙ, in v₂ corresponding to the index, iₙ'
                 in v₂'
             10 {y}ᵢ = {y}ᵢ + {r}ᵢₙ {w}ⱼ
         11) Next j
12) Next i.
```

22. A classification system designed to incorporate iterative training as claimed in claim 18 wherein the matrix outer product structure of R includes a matrix of entries which is symmetric, non-negative definite, and square by structure, and w is a plurality of polynomials.

23. A classification system designed to incorporate iterative training as claimed in claim 22 wherein the matrix outer product structure of R includes an equation $$R = \sum_{i=1}^{n} p(x_i)(p(x_i))^t.$$

24. A classification system designed to incorporate iterative training as claimed in claim 23 wherein p(x) is a vector generally in a form $$p(x) = \begin{vmatrix} 1 \\ x_1 \\ x_2 \\ \vdots \\ x_n \\ \vdots \\ x_{i_1} x_{i_2} \ldots x_{i_k} \\ \vdots \end{vmatrix}$$

where $i_1 \leq i_2 \leq \ldots \leq i_k$ and k is the degree.

25. A classification system designed to incorporate iterative training as claimed in claim 24 wherein R is a matrix generally in a form $$R = p(x)p(x)^t.$$

26. A classification system designed to incorporate iterative training as claimed in claim 25 wherein the memory having stored therein all of the unique entries in R includes a vector, r, of the unique monomials generally in a form $$\sum_{j=1}^{n} x_{j,i_1} \ldots x_{j,i_{2k}}$$

where:

$$x_j = \begin{vmatrix} x_{j,1} \\ x_{j,2} \\ \vdots \\ x_{j,m} \end{vmatrix}.$$

27. A classification system designed to incorporate iterative training as claimed in claim 26 wherein the memory has stored therein an associated unique number for each unique monomial, with the different unique numbers being assigned to unique monomials by converting p(x) to p(q), where q is a vector of primes, having entries $$(q_{i_1} q_{i_2} \ldots q_{i_k})$$

where: $q_{i_j}$ is an integer and $i_1 \leq i_2 \leq \ldots \leq i_k$.

28. A classification system designed to incorporate iterative training as claimed in claim 27 wherein the memory has stored therein an associated unique number for each unique monomial with entries $$(q_{i_1} q_{i_2} \ldots q_{i_{2k}})$$

where: $q_{i_j}$ is an integer and $i_1 \leq i_2 \leq \ldots \leq i_{2k}$.

\* \* \* \* \*